(No Model.)

G. W. DAVISSON.
AUTOMATIC STOP.

No. 301,692. Patented July 8, 1884.

Attest:
Edward Stew.
Geo. S. Wheelock.

Inventor:
Geo. W. Davisson
By Knight Bros
Attys

UNITED STATES PATENT OFFICE.

GEORGE W. DAVISSON, OF ST. LOUIS, MISSOURI.

AUTOMATIC STOP.

SPECIFICATION forming part of Letters Patent No. 301,692, dated July 8, 1884.

Application filed May 26, 1884. (No model.)

*To all whom it may concern:*

Be it known that I, GEORGE W. DAVISSON, of the city of St. Louis, in the State of Missouri, have invented a certain new and useful Improvement in Automatic Stops, of which the following is a full, clear, and exact description, reference being had to the accompanying drawings, forming part of this specification, and in which—

Figure 1:
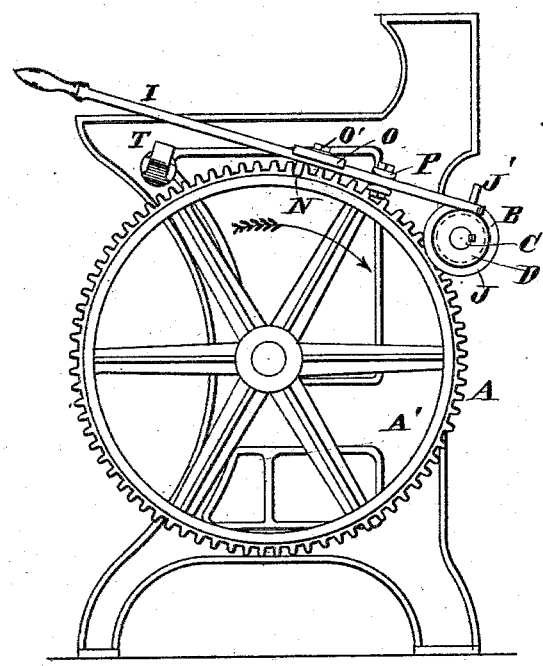
Figure 2:
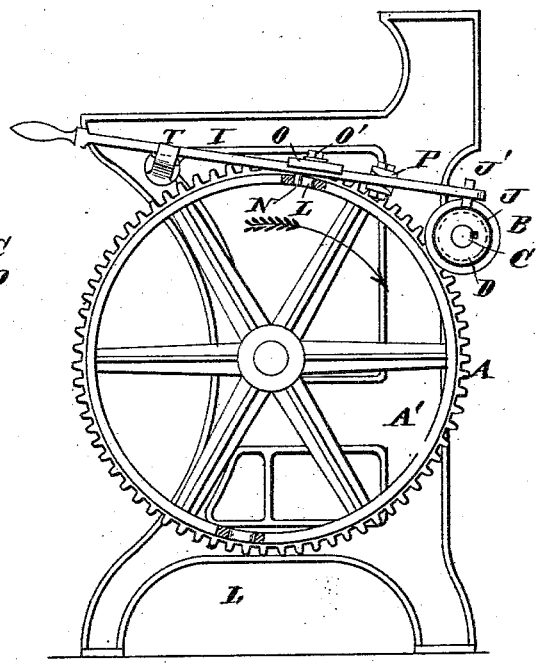
Figure 3:
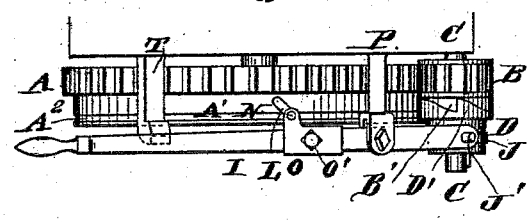
Figure 4:
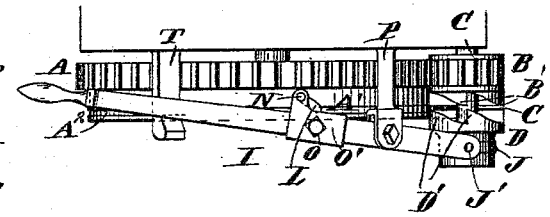

Figure 1 is an end elevation with the wheel unlocked. Fig. 2 is a similar view with the wheel locked. Fig. 3 is a top view with the wheel unlocked; and Fig. 4 is a similar view with the wheel locked.

My invention relates to a device to be used on machines having an intermittent movement, such as plug-tobacco machines, &c.

My invention consists in features of novelty hereinafter fully described, and pointed out in the claims.

Referring to the drawings, A represents a cog-wheel, and B a driving-pinion, of a plug-tobacco or other machine designed to have an intermittent movement; and C represents the main driving-shaft by which the pinion B is supported, and on which the pinion turns, except when locked to the shaft by a sliding clutch, D, that is made to turn with the shaft by a feather-and-groove or other suitable connection. The pinion has notches or teeth B', that lock with teeth or notches D' on the clutch when it (the clutch) is moved over toward the pinion, and when it is moved away from the pinion the teeth are disengaged, and the shaft C thus thrown out of gear with the wheel.

I represents a lever connected by one end to the sliding clutch by any suitable means that will not interfere with the turning of the clutch when the machine is in operation. I have shown the clutch provided with a ring, J, that has a pin, J', fitting in a hole in the end of the lever.

The wheel A has a rim, A', outside or inside, if desired, of the cogs, and in this rim is one or more inclined slots, L. I have shown two, that receive a pin, N, made fast to the lever by a block, O, and set-screw O', or other suitable means. The lever is fulcrumed to an arm, P, secured to the machine, or to any other suitable support.

The operation is as follows: Suppose the machine to be out of gear, as shown most plainly in Fig. 4. The free end of the lever is first raised to disengage the pin N from the slot L, (the connection between the lever I, arm P, and ring J being such as to allow the free end of the lever to be raised, as shown in Figs. 1 and 2,) and then moved outward to slide the clutch D over into engagement with the pinion. The free end of the lever is then released, and the pin N rides on the rim A' of the wheel A until the slot L comes around again, or until another slot L comes around, if there are more than one, and then the pin drops into it, and the free end of the lever, owing to the incline of the slot, is forced inward from the position shown in Fig. 3 to that shown in Fig. 4, which disengages the clutch from the pinion. This stop is thus positive in its operation to throw the machine out of gear, and it may be made to work as frequently or as often as desired by simply multiplying the slots L.

To prevent the arm being accidentally raised and forced outward, a guard-arm, T, may be secured to the frame, as shown, and provided with a head to hold the lever in its inner position.

The rim A' could be secured to the shaft of the wheel A, instead of the wheel itself.

The rim A' may have a circumferential groove, A², to receive the end of the pin N while it is riding on the rim.

I claim as my invention—

1. The combination of the pinion, clutch, lever fulcrumed to a support and connected to the clutch, stop-pin on the lever, cog-wheel engaging with the pinion and rim made to turn with the cog-wheel, and having a slot, arranged and operating substantially as and for the purpose set forth.

2. The combination of the pinion, clutch, lever fulcrumed to a support and connected to the clutch, stop-pin secured to the lever, cog-wheel engaging with the pinion, rim formed upon the cog-wheel, and having a groove, one or more inclined slots in the rim, and the guard-arm T, all arranged and operating substantially as and for the purpose set forth.

GEO. W. DAVISSON.

In presence of—
GEO. H. KNIGHT,
SAML. KNIGHT.